(12) United States Patent
Hill et al.

(10) Patent No.: US 7,899,921 B2
(45) Date of Patent: Mar. 1, 2011

(54) VERIFYING AND MAINTAINING CONNECTION LIVELINESS IN A RELIABLE MESSAGING FOR WEB SERVICES ENVIRONMENT

(75) Inventors: Richard D. Hill, Kirkland, WA (US); Stefan R. Batres, Sammamish, WA (US); Shy Cohen, Bellevue, WA (US); Michael J. Moroney, Bellevue, WA (US); Rodney T. Limprecht, Woodinville, WA (US); Margaret J. Lye, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1825 days.

(21) Appl. No.: 11/007,372

(22) Filed: Dec. 8, 2004

(65) Prior Publication Data

US 2006/0123119 A1 Jun. 8, 2006

(51) Int. Cl.
*G06F 15/16* (2006.01)
(52) U.S. Cl. .............. 709/230; 709/227; 709/228; 709/229
(58) Field of Classification Search ......... 709/227–230; 718/100
See application file for complete search history.

(56) References Cited

U.S. PATENT DOCUMENTS

| 4,635,187 | A * | 1/1987 | Baron et al. ............. 718/100 |
| 6,976,071 | B1 * | 12/2005 | Donzis et al. .............. 709/224 |
| 7,213,063 | B2 * | 5/2007 | Bressoud et al. ............ 709/223 |
| 7,562,147 | B1 * | 7/2009 | Cohen ........................ 709/228 |
| 7,584,274 | B2 * | 9/2009 | Bond et al. ................. 709/223 |
| 7,610,388 | B2 * | 10/2009 | Yamamoto .................. 709/227 |
| 2003/0128676 | A1 | 7/2003 | Lee ............................ 370/328 |
| 2004/0205781 | A1 * | 10/2004 | Hill et al. ................... 719/328 |
| 2006/0291580 | A1 * | 12/2006 | Horvitz ..................... 375/265 |

FOREIGN PATENT DOCUMENTS

| EP | 767558 A1 * | 4/1997 |
| EP | 1 463 249 | 9/2004 |

OTHER PUBLICATIONS

Bilorusets, R., Web Services Reliable Messaging Protocol (WS-Reliable Messaging), Mar. 2004. [retreived from Internet Nov. 3, 2009].*

(Continued)

*Primary Examiner*—Joseph Thomas
*Assistant Examiner*—Lashanya R Nash
(74) *Attorney, Agent, or Firm*—Workman Nydegger

(57) ABSTRACT

The present invention monitors the receipt of messages between two endpoints on established sequence session in accordance with a Reliable Messaging protocol for Web Services (RM-WS protocol). The messages received may be application or infrastructure messages (e.g., acknowledgement messages in accordance with the RM-WS protocol). Further, the present invention defines a time period known as the inactivity timeout, which is an upper limit to the time that may pass without receiving a message (either application or infrastructure) on the sequence session. Based on this inactivity timeout period, the present invention calculates time periods for sending idempotent infrastructure messages in accordance with the RM-WS protocol for verifying and maintaining connection liveliness.

37 Claims, 3 Drawing Sheets

OTHER PUBLICATIONS

Mukhi, N., Plebani, P., "Supporting policy-driven behaviors in web services: experiences and issues"; International Conference on Service Oriented Computing, Proceedings of the 2nd International conference on Service Oriented computing, pp. 322-328. 2004. [retreived from ACM on Nov. 3, 2009].*

Vogels, W., "Web Services are not distributed objects"; Internet Computing, IEEE. Nov.-Dec. 2003, vol. 7, Issue 6; pp. 59-66. [retrieved from IEEE on Nov. 3, 2009].*

Priice, R., Tino, P., "Still Alive: Extending Keep-Alice Intervals in P2P Overlay Networks"; School of Computer Science, University of Birmingham; Birmingham, United Kingdom. [retrieved from Internet on Nov. 19, 2009, "http://www.cs.bham.ac.uk/~rmp/files/stillAlive.pdf"].*

*Web Services Reliable Messaging TC: WS-Reliability 1.1*, Kazunori Iwasa, et al. eds., Committee Draft 1.086, Aug. 24, 2004, pp. 1-72, available at http://docs.oasis-open.org/wsrm/2004/06/WS-Reliability-CD1.086.pdf.

Bilorusets, et al., *Web Services Reliable Messaging Protocol (WS-ReliableMessaging)*, Copyright 2002-2004 BEA Systems, Inc., International Business Machines Corporation, Microsoft corporation, Inc., and TIBCO Software, Inc., Mar. 2004, pp. 1-40, available at ftp://www6.software.ibm.com/software/developer/library/ws-reliablemessaging200403.pdf.

Fielding, et al., Part of *Hypertext Transfer Protocol—HTTP/1.1*, Introduction, pp. 1-5, available at http://www.w3.org/Protocols/rfc2616/rfc2616-sec1.html.

Fielding, et al., Part of *Hypertext Transfer Protocol—HTTP/1.1*, 10 Status Code Definitions, pp. 1-11, available at http://www.w3.org/Protocols/rfc2616/rfc2616-sec10.html.

Banks, et al., *HTTPR Specification*, Francis Parr ed., Apr. 1, 2002, pp. 1-57, available at http://www-128.ibm.com/developerworks/webservices/library/ws-httprspec/index.html.

*Web Services Architecture*, David Booth, et al., eds., W3C Working Group Note, Feb. 11, 2004, pp. 1-106, available at http://www.w3.org/TR/ws-arch/.

Plank, James S., et al. "The Effect of Timeout Prediction and Selection on Wide Area Collective Operations" Network Computing and Applications, 2001, IEEE International Symposium on Oct. 8-10, 2001, Piscataway, NJ, pp. 320-329.

Lee, Sangmi, et al. "Wireless Reliable Messaging Protocol for Web Services" Web Services, 2004 Proceedings, IEEE International Conference on San Diego, CA Jul. 6-9, 2004, pp. 350-357.

* cited by examiner

VERIFYING AND MAINTAINING CONNECTION LIVELINESS IN A RELIABLE MESSAGING FOR WEB SERVICES ENVIRONMENT

CROSS-REFERENCE TO RELATED APPLICATIONS

N/A

BACKGROUND OF THE INVENTION

1. The Field of the Invention

The present invention generally relates to Reliable Messaging protocols for Web Services. More specifically, the present invention provides for a mechanism that leverages characteristics of Reliable Messaging protocols for Web Services (RM-WS) for verifying and maintaining connection liveliness in a sequence session.

2. Background and Related Art

Computer networks have enhanced our ability to communicate and access information by allowing one computer or device to communicate over a network with another computing system using electronic messages. When transferring an electronic message between computing systems, the electronic message will often pass through a protocol stack that performs operations on the data within the electronic message (e.g., parsing, routing, flow control, etc.). The Open System Interconnect (OSI) model is an example of a network framework for implementing a protocol stack.

The OSI model breaks down the operations for transferring an electronic message into seven distinct layers, each designated to perform certain operations in the data transfer process. While protocol stacks can potentially implement each of the layers, many protocol stacks implement only selective layers for use in transferring data across a network. When data is transmitted from a computing system, it originates at the application layer and is passed down to intermediate lower layers and then onto a network. When data is received from a network it enters the physical layer and is passed up to the higher intermediate layers and then is eventually received at that application layer. The application layer—the upper most layer—is responsible for supporting application and end-user processing. Further, within the application layer there may reside several other layers (e.g., the Simple Open Access Protocol (SOAP) layer). Another layer incorporated by most protocol stacks is the transport layer. An example of a transport layer is the Transmission Control Protocol (TCP).

Web Services (WS) have been a driving force in advancing communications between computing systems and are turning the way we build and use software inside-out. Web Services let applications share data and—more powerfully—invoke capabilities from other applications without regard to how these applications where built; what operating systems or platform they run on; and what devices are used to access them. Web Services are invoked over the Internet by means of industry-standard protocols including SOAP, XML (extensible Markup Language), UDDI (Universal, Description, Discovery and Integration), WSDL (Web Service Description Language), etc. Although Web Services remain independent of each other, they can loosely link themselves into a collaborating group that performs a particular task.

Current WS technologies offer direct SOAP-message communication between an initiator (e.g., a client) and an acceptor (e.g., a service). In the common bi-directional messaging case, a SOAP request message is sent from the initiator to the acceptor and a SOAP reply message is sent in response thereto. Another communication variant between endpoints is unidirectional message exchange, where the initiator sends a message to the acceptor with no response.

A key benefit of the emerging WS architecture is the ability to deliver integrated, interoperable solutions. Because, however, Web Services provide various services from different business, originations, and other service providers via unreliable communication channels such as the Internet, reliability of WS becomes an increasing important factor. Reliability of WS is impacted by several factors including but not limited to, the reliability of the Web Service end points; reliability characteristics of the communication channel over which the Web Services are accessed; performance and fault-tolerance characteristics; and the extent to which Web Services can handle concurrent client access.

There have been attempts at accomplishing reliable messaging of Web Services by choosing a reliable transport protocol over which the messages (e.g., SOAP messages) are exchanged between endpoints. For example, a reliable messaging transport such as message-queues can be used to deliver messages reliably between initiators and acceptors. Messing-queuing communication technologies enable applications on different systems to communicate with each other by sending messages to queues and reading messages from queues that are persisted across failures for reliability.

Although queuing systems offer a transport that can be used to carry SOAP messages reliably, there are several drawbacks to such systems. For instance, these systems offer solutions for an asynchronous operation where the requests (and possibly their responses) are transferred and processed with isolation. Accordingly, these systems are typically heavyweight in terms of resources; involving multiple intermediaries with durable transacted message stores and with considerably more complexity in deployment, programming model and management. All of this is unnecessary for reliable direct communication, and detracts from the goal of minimizing latency. Further, the program model does not directly support request-response style programming or sessions. Accordingly, the queued communication model is different from the current "interactive" Web Services model, and does not address critical "connected" scenarios and "interactive" applications. For example, it is not well suited for cases where a response is expected in a timely manner, or for cases where distributed-transaction-context need to be shared between initiator and acceptor.

There have also been attempts at defining reliable transfer layers over fundamentally unreliable transport protocols, e.g., reliable HTTP or HTTPR. A common problem, however, that plagues this solution—as well as the queuing solution—is that reliable messaging can be achieved only if the specific reliable transport protocol is used for communication between the initiator and the acceptor. The fundamental nature of Web Services calls for independence from specific vender platform, implementation languages and specific transport protocols. In a generic case, an initiator may not be able to transmit a message directly to an acceptor using a particular protocol (e.g., acceptor does not support the protocol) or the message may need to pass through multiple hops after leaving the sending node prior to arriving at that destination node. Depending on the nature of the connectivity between the two nodes involved in a particular hop, a suitable transport protocol that does not offer reliable messaging characteristics may have to be chosen.

Intermediaries may also exist at different levels in the protocol stack; and therefore not offer full end-to-end reliability. For example, transport protocols may offer reliability across lower level intermediaries (e.g., IP level intermediaries—e.g., IP routers). The transport protocol may end, however, at a SOAP intermediary or application layer. Accordingly, the transport protocol may not be able to offer reliability across that intermediary, i.e., no end-to-end reliability across the application layer.

More recently, various Reliable Messaging protocols for Web Services (hereinafter referred to as "RM-WS protocols"), e.g., WS-ReliableMessaging, offer solutions to the above identified-deficiencies of current reliable messaging systems. These protocols are transport agnostic connected protocols that allow messages to be delivered reliably between end-point applications in presences of software component, system or network failures. Accordingly, RM-WS protocols offer solutions for reliable, end-to-end, session-oriented communication between an initiator and an acceptor.

These RM-WS protocols are akin to TCP in that TCP offers reliable, exactly-once, in-order delivery of a stream of bytes from a TCP sender to TCP receiver across Internet Protocol (IP) routers and multiple networks. Reliable Messaging protocols for WS offer the same and more for messages (note: the unit of transfer is a message, not a byte or a collection of bytes as is the case for TCP wherein the size of the bytes is determined by the available payload space in the IP packet) across multiple intermediaries (including SOAP level intermediaries), transports and connections. Although TCP and RM-WS protocols are both "reliable" protocols, because RM-WS resides at the application or SOAP layer in the OSI model, RM-WS protocols provide for reliable messaging regardless of the transport protocol used to transfer the data. Accordingly, RM-WS protocols are not tied to a particular transport or other protocol used to transfer message between endpoints.

Although a few RM-WS protocols have been around for some time there are still several drawbacks and deficiencies of these protocol specs. For example, these RM-WS protocols do not provide a way for verifying the connectivity of an established sequence session. Further, the specifications do not provide for a way to maintain the liveliness of a connection and/or to extend the sequence session in the absence of an exchange of messages over an inactivity timeout period. Accordingly, there exists a need to verify and maintain connection liveliness for systems that use a RM-WS protocol.

BRIEF SUMMARY OF THE INVENTION

The above-identified deficiencies and drawbacks of current Reliable Messaging protocols for Web Services are overcome through exemplary embodiments of the present invention. For example, the present invention provides for mechanisms of verifying the existence of a sequence connection and maintaining connection liveliness between end-points by utilizing a Reliable Messaging protocol for Web Services (RM-WS protocol).

For example, when maintaining connection liveliness at an initiator endpoint, the present invention provides for establishing a sequence session, identified by a unique sequence identifier, at an application layer between two end-points in accordance with a RM-WS protocol. Based on the request to create the sequence session, a unique sequence identifier corresponding to the sequence session created is received. Thereafter, or at any other time, an inactivity timeout period for the sequence session is identified, which represents an upper limit to the time that may pass without receiving a message for the sequence session. In accordance with an algorithm that is based on the inactivity timeout period, a keep-alive expiration timeout is calculated. Based on the calculated keep-alive expiration timeout, a message that includes the unique sequence identifier is sent. Thereafter, a message that includes the unique sequence identifier is received before the inactivity timeout period such that connection liveliness is maintained. Based on the received message, an inactivity timer is reset for the inactivity timeout period such that the sequence session is kept alive.

In another example embodiment for verifying connection liveliness, a sequence session, identified by a unique sequence identifier, at an application layer between two end-points is established in accordance with a RM-WS protocol. Similar to above, an inactivity timeout period is identified, which is an upper limit to the time that may pass without exchanging a message between the two end-points for the sequence session. Before the inactivity timeout period expires, a message for verifying the connection is received, which includes a unique sequence identifier corresponding to the sequence session. Based on the received message, an inactivity timer for the inactivity timeout period is reset such that the sequence session is kept alive.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems and computer program products for mechanisms that leverage Reliable Messaging protocols for Web Services (RM-WS) for verifying and maintaining connection liveliness in a sequence session. The embodiments of the present invention may comprise a special purpose or general-purpose computer including various computer hardware, as discussed in greater detail below.

The present invention is directed towards extensions of Reliable Messaging protocols for Web Services (hereinafter referred to as "RM-WS protocols"), e.g., WS-ReliableMessaging (WS-RM), which describe specifications that allow message to be delivered reliably between distributed applications in the presence of software component, system or network failures. Reliable Messaging protocols for Web Services facilitate the successful transmission of a message from a source (hereinafter "an initiator") to a destination, e.g., a service, (hereinafter "an acceptor") and ensures that error conditions are detectable. These protocols are transport agnostic, allowing them to be implemented using different network transfer technologies. Further, various implementations of reliable messaging protocols hide intermittent communication failures from the applications, and may provide recoverability in the case of system failures.

The present invention monitors activity on an established sequence session between two endpoints, which is defined as the action of receiving messages for that sequence. The messages received may be application or infrastructure messages (e.g., acknowledgement messages in accordance with a RM-WS protocol). Further, the present invention defines an inactivity timeout (IT) period, which is an upper limit to the time that may pass without receiving a message (either application or infrastructure) on the sequence session. When that upper limit is reached, the other end-point is considered not to be present and the sequence is considered lost or abandoned. If, on the other hand, a message is received before the IT expires, an IT timer is reset and the connection is verified. In another yet related embodiment, based on an identified IT, the present invention calculates an initial time and a periodicity for sending RM-WS idempotent protocol infrastructure messages between the endpoints in an attempt to maintain connection liveliness.

Figure 1A:
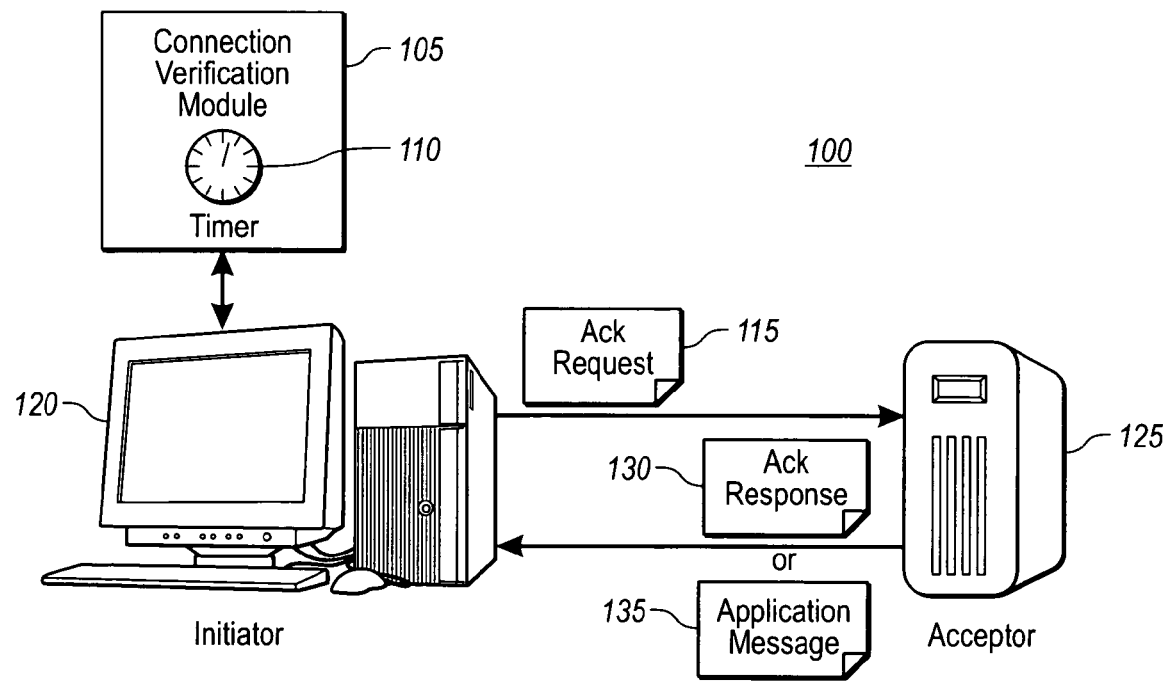
FIG. 1A illustrates a computing system for verifying and maintaining connection liveliness by leveraging features of a RM-WS protocol in accordance with example embodiments of the present invention.

FIG. 1A illustrates a distributed computing system 100 that may be used to practice some of the above described example embodiments. A sequence session may be established between an initiator 120 and an acceptor 125 in accordance with a RM-WS protocol. The sequence session established may span multiple or no actual network connections, depending upon the transport being used. Further, connections may be different over time (e.g., use one connection now and a different one later) and topology (e.g., different transport types for each hop). For example, if the messages are exchanged by copying the message on a floppy disk and passing disks between the initiator 120 and acceptor 125, there is no real physical connection between the computers and yet by leveraging characteristics of a RM-WS protocol, the present invention can create a session between the communicating parties, i.e., the initiator 120 and acceptor 125.

Note that the floppy example was given for illustrative purposes, and is not a typical use case. A more typical use case for "interactive applications" would be the use of TCP/IP, HTTP (possibly layered over TCP/IP), UDP/IP, pipes, or other real-time transport mechanisms.

Example embodiments provide that the initiator 120 will be primarily responsible for maintaining connection liveliness. Accordingly, this embodiment supports un-addressable (i.e., anonymous) initiators 120, such a client behind a firewall that is communicating with the acceptor 125 through request-response protocols such as SOAP over HTTP. Note, however, that in the event that the initiator 120 is addressable (and in some instance even if anonymous), either endpoint (i.e., initiator 120 or acceptor 125) may verify connection liveliness as described below. Accordingly, although the following examples typically refer to the initiator 120 as maintaining and verifying connection liveliness, such reference is used for illustrative purposes and is not meant to limit or otherwise narrow the scope of the present invention unless explicitly claimed.

Regardless of whether the initiator 120 is anonymous or not, initiator 120 utilizes a connection verification module 105 that includes a timer 110 in order to prevent an established sequence session from terminating due to inactivity in the absence of application 135 or infrastructure 130 messages. For example, based on an identified inactivity timeout (IT), connection verification module 105 utilizes an algorithm to initiate an RM-WS infrastructure message exchange to prevent inactivity timeout on both sides of the connection. For instance, leveraging the RM-WS acknowledgement request message Ack Request 115 (note that in the case of WS-RM, the acknowledgment request message AckRequested may be used), and using a specifically crafted algorithm, connection verification module 105 determines a time period to send an initial Ack Request message 115 (a.k.a., and interchangeably referenced herein as "keep-alive" message 115) to the other side.

Note that example embodiments allow for the IT to be tunable at the application layer based on such things as latency issues, reliability of the network and other considerations. For instance, in the above floppy example, the inactivity timeout period would need to be relatively large in duration to allow for the latency imposed by the communication medium, where other systems may require relatively short durations for keeping the session open without receiving messages from acceptor 125. Accordingly, the IT may be tunable on a per connection basis and may be negotiated between the initiator 120 and the acceptor 125 before the establishment of the sequence session and/or dynamically modified after the session is established.

Regardless of the IT value, when acceptor 125 receives the Ack Request message 115 the acceptor 125 resets its inactivity timer (not shown). Note that regardless of whether the acceptor 125 receives an infrastructure 130 (e.g., Ack Request 115) or application-level 135 message, the inactivity timer will be reset. At this point, the acceptor 125 can verify the connection liveliness.

Similarly, in order to verify connection liveliness at the initiator 120, the initiator 120 will need to receive messages for the sequence session (either application 135 or infrastructure 130). Accordingly, when acceptor 125 receives Ack Request message 115, typically it responds by sending a RM-WS acknowledgment response message Ack Response 130 (e.g., in the case of WS-RM, acceptor 125 sends an Ack message). Upon receiving the Ack Response or Ack 130, the initiator 120 validates the connection liveliness and resets the inactivity timer 110 on the initiator 120 side and the connection liveliness is maintained. Note, as mentioned above, that an application message 135 received by the initiator 120 before expiration of the inactivity timeout will also reset the timer 110. In such instance, connection verification module 105 is reset and recalculates the initial period for sending an Ack Request 115 message.

Further note that regardless of whether or not a message (either application 135 or infrastructure message 130) is received by the initiator 120, the sequence session is at least extended on the acceptor 125 side. Accordingly, in the instance where the initiator 120 is anonymous (or in some circumstances where the initiator 120 is addressable), there may not be an inactivity timeout for the initiator 120. Accordingly, the periodic sending of the Ack Request messages 115 may verify connection liveliness at the acceptor 125 regardless of whether or not messages are received by initiator 120. In fact, the reverse is also true, wherein the acceptor 125 doesn't enforce the inactivity timeout, but the connection is extended on at the initiator 120 when messages are received.

It is also important to note that the infrastructure messages are not transferred reliably and may be lost at any time during the exchange. Accordingly, Ack Request message 115 may be lost from the initiator 120 to the acceptor 125. Likewise Ack Response 130 message may be lost in transit from the acceptor 125 to the initiator 120. In such instances, example embodiments provide for a specially tuned algorithm based on the inactivity timeout period for periodically sending the Ack Request 115 to acceptor 125. Note that the infrastructure messages 115, 135 are idempotent so no duplication detection is required and order doesn't matter.

Figure 1B:
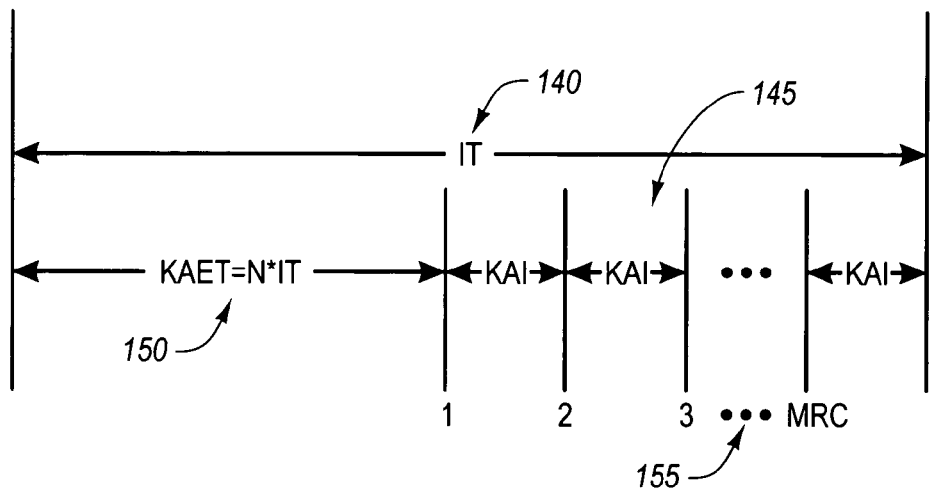
FIG. 1B illustrates a timeline for an algorithm that may be used to calculate the intermittency or periodicity for sending RM-WS protocol infrastructure messages for maintaining connection liveliness in accordance with example embodiments of the present invention.

Connection verification module 105 utilizes the above referenced specially crafted algorithm for selecting the times for initial and subsequent periodic attempts to initiate an exchange as described above. FIG. 1B illustrates an example timeline representation of a possible algorithm used for sending keep-alive or Ack Request messages 115. As shown in FIG. 1B, this algorithm timeline is based on one or more of at least three properties. First, the inactivity timeout (IT) 140 mentioned above, which defines how long the initiator 120 will wait without receiving messages from the acceptor 125 before failing or abandoning the sequence session. Next, the maximum retry count (MRC) 155 is the number of times that the initiator 120 will attempt to retransmit a message before giving up. This applies to both application and infrastructure messages (e.g., keep-alive messages 115). Third, the keep-alive expiration timeout (KAET) 150 is defined as the interval the initiator 120 will wait without getting a message from the acceptor 125 before it begins to send keep-alive messages 115—i.e., the KAET 150 is some fraction (N) of the IT 140 that defines the initial time to send a keep-alive message 115. In the following examples, N is set at a default value of 0.5. Accordingly, the initiator 120 will begin sending keep-alive messages 115 after half of the IT 140 has passed with no activity from the acceptor 125.

Based on these three properties, a Keep-Alive Interval (KAI) 145—i.e., the interval between successive or periodic sending of keep-alive messages 115—can be calculated. For example, the keep-alive interval 145 may be calculated using the algorithm KAI=IT*(1−N)/MRC. The relationship between IT 140, KAET 150, MRC 155, and KAI 145 is illustrated as shown in FIG. 1B. Note that although a specific algorithm was used to define KAET 150 and KAI 145, other algorithms and ways for determining when to send Ack Request message or keep-alive messages 115 are also available to the present invention. For example, the periodicity (i.e., KAI 145) for sending the keep-alive messages 115 may be randomly chosen. Accordingly, the use of the above specific algorithm for determining these values is used for used for illustrative purposes only and it is not meant to limit or otherwise narrow the scope of the present invention unless explicitly claimed.

Nevertheless, typically the initiator 120 will calculate the IT 140, KAET 150 and the KAI 145 in terms of a periodic timer interval. For example, if the IT 140 was two hours, the MRC 155 was five, and the periodic timer interval was two seconds, then using the equations and assumptions above (e.g., N=0.5) KAET 150 would equal one hour and the KAI would equal twelve minutes. Converting the values to seconds and dividing by the timer interval yields the following: IT/(timer interval)=7200/2=3600 timer ticks; KAET/(timer ticks)=3600/2=1800 timer ticks; and KAI/(timer interval)=720/2=360 timer ticks. Accordingly, initiator 120 in this case will begin sending keep-alive messages 115 after 1800 timer ticks. Initiator 120 will also send a keep-alive message every 360 timer ticks, until 3600 ticks have passed in all. If the initiator 120 has not received a message from the acceptor 125 during this duration (i.e., over the IT interval), initiator 120 will fault the sequence session.

In an alternative example embodiment, the above implementation can be achieved using two timers. A first timer is set with a timer interval equal to the IT 140. This first timer is reset whenever a message is received from the acceptor 125. If the first timer expires with no activity from, the acceptor 125, the initiator 120 will terminate the sequence session. The second timer is set with a timer interval equal to the KAET 150. When this second timer expires, the initiator 120 will send a keep-alive message 115 to the acceptor 125, and will reset the second timer with a timer interval of KAI 145. Further, the second timer will be reset with a timer interval of KAI 145 upon subsequent second timer expirations (i.e., after each lapse of the KAI 145 time interval without receiving a message). Whenever a message 130, 135 is received from the acceptor 125, the initiator 120 will reset the second timer with a timer interval equal to the KAET 150, and the process is repeated.

Note that while waiting to send a keep-alive message 115, an application message may become available for the initiator 120 to send. This may occur because the initiator 120 application sent a message or because the initiator 120 retry algorithm determined that it was time to resend a buffered application message. If this occurs, exemplary embodiments provide that the initiator 120 will restart its KAI 145 (or possibly KAET 150) interval. In other words, initiator 120 will not send another keep-alive 115 message until an interval of KAI 145 (or KAET 150) has passed since the application message was sent. Accordingly, the initiator 120 will send some form of message, either application or infrastructure, at least every KAI 145 interval. Further, keep-alive messages 115 will be typically sent even if application messages sent are blocked for whatever reason, e.g., network congestion.

Note that other embodiments allow for an Ack Request 115 message to be added to an application message sent. This embodiment may be used, e.g., when the IT 140 is about to expire in order to prompt the acceptor 125 to expedite sending an Ack Response or Ack 130 rather then waiting to acknowledge a batch of messages. In this case, the Ack Request 115 message would commonly be represented as a protocol element (e.g., a header or other indicator defined by a RM-WS protocol, e.g., WS-RM) that is included with the application message 135. As such, "Ack Request 115 message" should be broadly interpreted to include instances where the Ack Request 115 is a protocol element as described above.

Other embodiments allow for including an Ack Request 115 for each of a plurality of sequence sessions in a single message (e.g., an application or infrastructure, e.g., Ack Requested 115, messages) according to the RM-WS protocol. Likewise, other embodiments allow for including an Ack Response 130 for each of a plurality of sequence sessions in a single message (e.g., application 135 or infrastructure, e.g., Ack 130, messages) according to the RM-WS protocol. This allows for verifying the liveliness of multiple sequences on receipt of a single message, thereby reducing the number of messages needed to maintain liveliness for multiple sequences between the same endpoints 120, 125.

The present invention may also be described in terms of methods comprising functional steps and/or non-functional acts. The following is a description of steps and/or acts that may be performed in practicing the present invention. Usually, functional steps describe the invention in terms of results that are accomplished whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims and the following description for the flow charts of FIGS. 3 and 4 are used to indicate the desired specific use of such terms.

Figure 3:
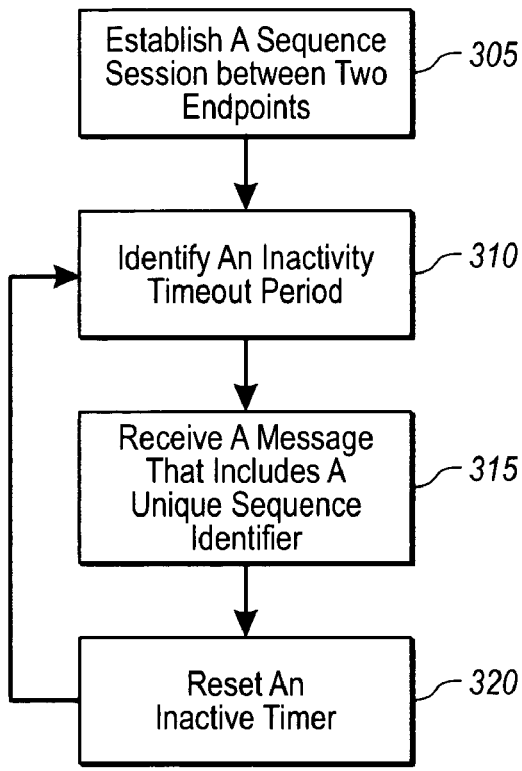
FIG. 3 illustrates a flow diagram of a method of maintaining connection liveliness in accordance with example embodiments of the present invention.
Figure 4:
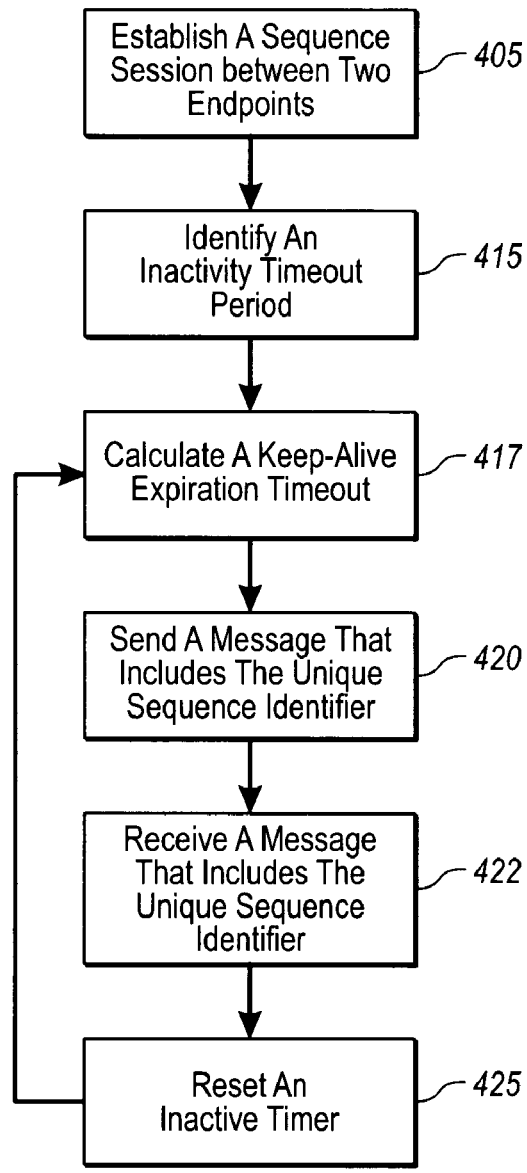
FIG. 4 illustrates a flow diagram of a method for verifying connection liveliness in accordance with example embodiments of the present invention.

FIGS. 3 and 4 illustrate example flowcharts for various exemplary embodiments of the present invention. The following description of FIGS. 3 and 4 will occasionally refer to corresponding elements from FIGS. 1A and 1B. Although reference may be made to a specific element from these figures, such elements are used for illustrative purposes only and are not meant to limit or otherwise narrow the scope of the present invention unless explicitly claimed.

FIG. 3 illustrates an example flowchart of a method 300 of verifying connection liveliness for a sequence session between endpoint applications by utilizing a RM-WS protocol. Method 300 includes an act of establishing 305 a sequence session between two end-points. For example, a sequence session may be established between initiator 120 and acceptor 125 in accordance with a RM-WS protocol (e.g., WS-ReliableMessaging). Method 300 further includes an act of identifying 310 an inactivity timeout. For example, connection verification module 105 may be used to identify an inactivity timeout (IT) 140, wherein the inactivity timeout period represents an upper limit on the time that may pass without exchanging a message between the initiator 120 and the acceptor 125 for the sequence session. This IT 140 may be tunable to allow for such things as latency imposed by the communication medium or the knowledge of the reliability of the underline network.

Before the inactivity timeout period expires, method 300 also includes an act of receiving 315 a message that includes a unique sequence identifier. For example, either initiator 120 or acceptor 125 may receive a message for verifying the connection liveliness, wherein the message includes a unique sequence identifier corresponding to the sequence session. The received message that includes the unique sequence identifier may be an application 135 message. Alternatively, the received message may be an infrastructure message 115, 130. For instance, if the message is received by the initiator 120, the received message may be Ack 130 in response to Ack Request 115 previously sent by initiator 120. If the message is received by acceptor 125, then the message may be a sequence Ack Request 115. Regardless of whether messages are application-level or infrastructure messages, other embodiments allow for a single message to include acknowledgment requests (e.g., Ack Request 115) or acknowledgments (e.g., Ack 130) for a plurality of sequence sessions. In addition, in the case where the Ack Request 115 is included in an application level message, typically the Ack Request 115 will be included in a protocol element, e.g., a header or other field of the message.

Based on the received message, method 300 further includes an act of resetting 320 an inactivity timer. For example, if the message is received at initiator 120, the initiator 120 can reset timer 110 within the connection verification module 105. An inactivity timeout period may then be recalculated and the process repeated. If after resetting the inactivity timer no application or infrastructure messages are received after the expiration of the inactivity timeout period 140, the sequence session may be abandoned.

FIG. 4 illustrates a flowchart of a method 400 for maintaining connection liveliness by an initiator for a sequence session between endpoints by utilizing RM-WS protocol. Method 400 includes an act of establishing 305 a sequence session between two end-points. For example, a sequence session, identified by a unique sequence identifier, may be established between initiator 120 and acceptor 125 in accordance with a RM-WS protocol (e.g., WS-ReliableMessaging). In order to establish the sequence session, initiator 120 will typically send to acceptor 125 a request to create one or more sequence sessions in accordance with a RM-WS protocol. Based on the request, acceptor 125 may generate unique sequence identifier(s) (e.g. a global unique identifier (GUID)), which will be used to identify the sequence session(s) created.

Also note that other ways of establishing a sequence session are also available to the present invention. For instance, the initiator 120 may generate the unique sequence identifier(s) and send them to the acceptor 125 in the request to create the sequence session(s). In fact, there are many other well known ways of establishing a sequence session that are available to the present invention. Accordingly, any specific reference to how a sequence session is established is used for illustrative purposes only and is not meant to limit or otherwise narrow the scope of the present invention unless explicitly claimed.

Regardless of how the sequence session is established, method 400 further includes an act of identifying 415 an inactivity timeout period for the sequence session. For example, connection verification module 105 may identify an inactivity timeout (IT) 140, which represents an upper limit to the time that may pass without receiving a message for the sequence session. This IT 140 may be tunable based on such things as the reliability of a transport network or other considerations such as minimum expected latency to receive an acknowledgement.

Method 400 further includes an act of calculating 417 a keep-alive expiration timeout. For example, connection verification module 105 may use an algorithm that is based on the inactivity timeout period 140 for calculating a keep-alive expiration time (KAET) 150, which is typically a fraction of the interval timeout 140. Based on the calculated keep-alive expiration timeout, method 400 further includes an act of sending message that includes the unique sequence identifier. The message may be an infrastructure message (e.g., Ack Request 115) or an application message 135. For example, initiator 120 upon expiration of the KAET 150 may send an Ack Request message 115, which is an infrastructure idempotent message defined by the RM-WS protocol. Regardless of whether the sent message is an application-level or infrastructure message, other embodiments allow for the message to include acknowledgment requests (e.g., Ack Request 115) for a plurality of sequence sessions.

Next method 400 includes an act of receiving 422 a message that includes the unique sequence identifier. That is, initiator 120 may receive an Ack Response 130 or an application message 135 from acceptor 125 that includes the unique sequence identifier. If the message (infrastructure or application message, e.g., 130, 135) is received before the inactivity timeout period 140, connection liveliness of the sequence session is maintained. Further, based on the received message, method 400 also includes an act of resetting 425 an inactivity timer. That is, based on the received Ack Response 130 or application message 135, inactivity timer 110 within the connection verification module 105 can be reset for the inactivity timeout 140 such that the sequence session is kept alive.

Note also that the received message could be an application-level message. In such instance, an Ack Response 130 may be included in the application-level message. Regardless of whether the received message is an application-level or infrastructure message, other embodiments allow for the message to include acknowledgments (e.g., Ack 130) for a plurality of sequence sessions.

Note also that the Ack Request messages 115 may correspond to messages that have already been acknowledged as received from acceptor 125. In other words, the Ack Request message 115 may be sent even if all messages have been acknowledged as received. Further, application messages to be sent to the acceptor may be blocked, but the Ack Request messages 115 should be sent anyway.

Further note that the algorithm for calculating the KAET 150 is based on some fraction (N) of the inactivity timeout 140. For example, the fraction of the inactivity timeout 140 used for calculating the KAET 150 may be one-half the inactivity timeout 140 such that an initial Ack Request or keep-alive message 115 is sent when an inactivity timer 110 reaches one-half the IT 140. Further, example embodiments provide for identifying a maximum retry count (MRC) 155, which is a maximum number of times that application and infrastructure messages 115 will be sent. Based on the maximum retry count 155, a keep-alive interval (KAI) 145 can be calculated, which represents the period of time for sending messages. Accordingly, one or more messages are sent based on the calculated KAI 145, wherein the messages sent should include an Ack Request message 115. Of course, as described above, the messages sent based on the KAI 145 may be application messages. Further, note that the inactivity timeout 140 is tunable based on a determined reliability of a transport network or other considerations.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 2:
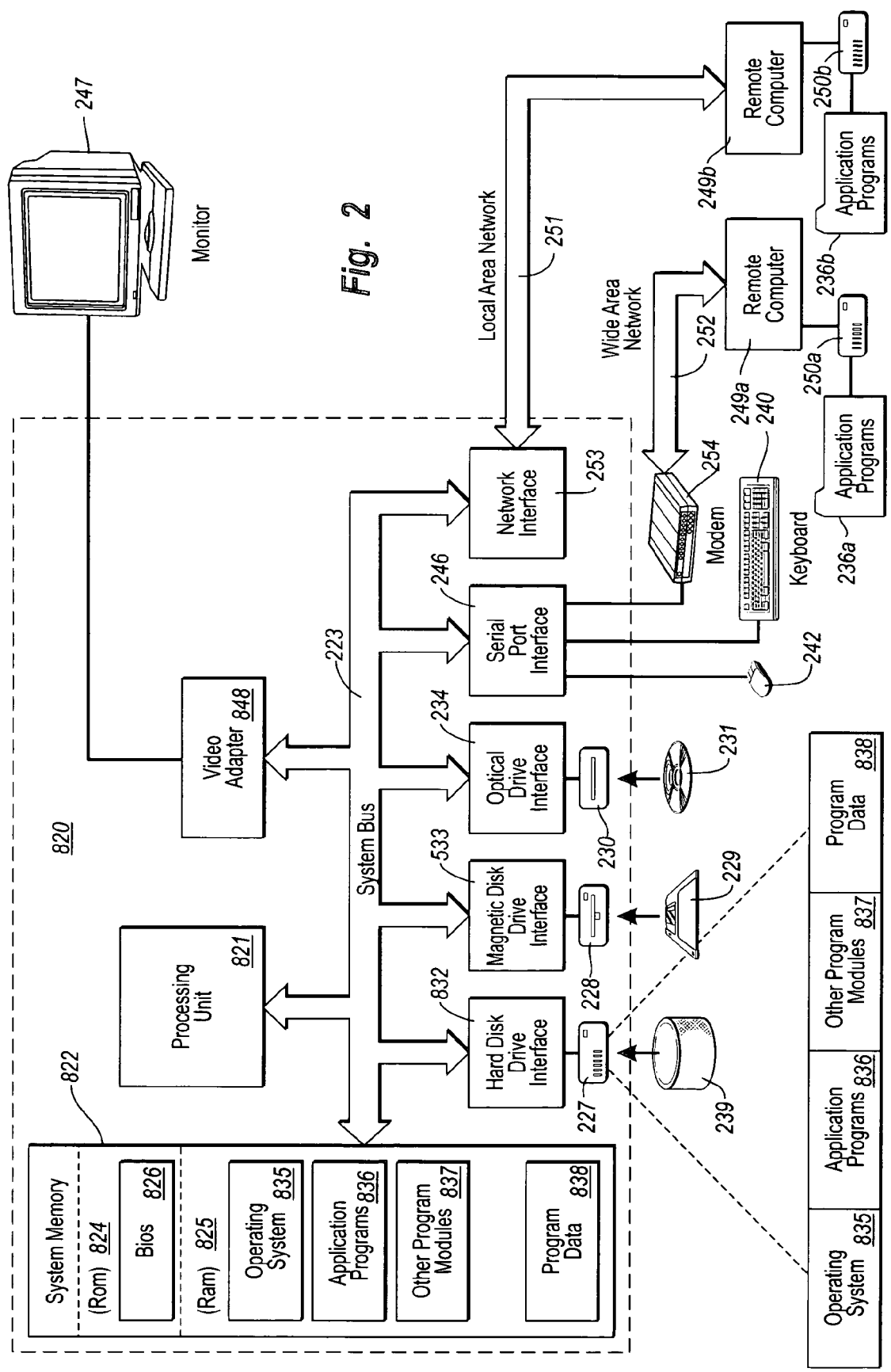
FIG. 2 illustrates an example system that provides a suitable operating environment for the present invention.

FIG. 2 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 2, an exemplary system for implementing the invention includes a general purpose computing device in the form of a conventional computer 220, including a processing unit 221, a system memory 222, and a system bus 223 that couples various system components including the system memory 222 to the processing unit 221. The system bus 223 may be any of several types of bus structures including a memory bus or memory controller, a peripheral bus, and a local bus using any of a variety of bus architectures. The system memory includes Read Only Memory (ROM) 224 and Random Access Memory (RAM) 225. A Basic Input/Output System (BIOS) 226, containing the basic routines that help transfer information between elements within the computer 220, such as during start-up, may be stored in ROM 224.

The computer 220 may also include a magnetic hard disk drive 227 for reading from and writing to a magnetic hard disk 239, a magnetic disk drive 228 for reading from or writing to a removable magnetic disk 229, and an optical disk drive 30 for reading from or writing to removable optical disk 231 such as a CD-ROM or other optical media. The magnetic hard disk drive 227, magnetic disk drive 228, and optical disk drive 30 are connected to the system bus 223 by a hard disk drive interface 232, a magnetic disk drive-interface 233, and an optical drive interface 34, respectively. The drives and their associated computer-readable media provide nonvolatile storage of computer-executable instructions, data structures, program modules and other data for the computer 220. Although the exemplary environment described herein employs a magnetic hard disk 239, a removable magnetic disk 229 and a removable optical disk 231, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 239, magnetic disk 229, optical disk 231, ROM 224 or RAM 225, including an operating system 235, one or more application programs 236, other program modules 237, and program data 238. A user may enter commands and information into the computer 220 through keyboard 240, pointing device 242, or other input devices (not shown), such as a microphone, joy stick, game pad, satellite dish, scanner, or the like. These and other input devices are often connected to the processing unit 221 through a serial port interface 246 coupled to system bus 223. Alternatively, the input devices may be connected by other interfaces, such as a parallel port, a game port or a Universal Serial Bus (USB). A monitor 247 or another display device is also connected to system bus 223 via an interface, such as video adapter 248. In addition to the monitor, personal computers typically include other peripheral output devices (not shown), such as speakers and printers.

The computer 220 may operate in a networked environment using logical connections, to one or more remote computers, such as remote computers 249a and 249b. Remote computers 249a and 249b may each be another personal computer, a server, a router, a network PC, a peer device or other common network node, and typically include many or all of the elements described above relative to the computer 220, although only memory storage devices 250a and 250b and their associated application programs 236a and 236b have been illustrated in FIG. 2. The logical connections depicted in FIG. 2 include a Local Area Network (LAN) 251 and a Wide Area Network (WAN) 252 that are presented here by way of example and not limitation. Such networking environments are commonplace in office-wide or enterprise-wide computer networks, intranets and the Internet.

When used in a LAN networking environment, the computer 220 is connected to the local network 251 through a network interface or adapter 253. When used in a WAN networking environment, the computer 220 may include a modem 254, a wireless link, or other means for establishing communications over the Wide Area Network 252, such as the Internet. The modem 254, which may be internal or external, is connected to the system bus 223 via the serial port interface 246. In a networked environment, program modules depicted relative to the computer 220, or portions thereof, may be stored in the remote memory storage device. It will be appreciated that the network connections shown are exemplary and other means of establishing communications over Wide Area Network 252 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method implemented by an initiator computer system in a Web Services (WS) environment for maintaining connection liveliness with an acceptor computing system for a sequence session between endpoints, comprising the initiator computing system and the acceptor computing system, by utilizing Reliable Messaging protocol for WS (RM-WS protocol), the method comprising acts of:

establishing a sequence session, identified by a unique sequence identifier, at an application layer between two endpoint applications in accordance with a RM-WS protocol;

identifying an inactivity timeout period for the sequence session, the inactivity timeout period having an upper limit of time that may pass without receiving a message for the sequence session prior to the initiator computing system abandoning or failing the sequence session;

calculating a keep-alive expiration timeout based on the inactivity timeout period and which defines an interval of time that the initiator computing system will wait without detecting activity by the acceptor computing system during the inactivity timeout period and prior to beginning transmission of one or more keep-alive messages to the acceptor computing system;

calculating a keep-alive time interval, the keep-alive interval defining an interval of time that is to occur prior to each successively transmitted keep-alive message after transmission of a first keep-alive message to the acceptor computing system within the inactivity timeout period;

sending the first keep alive message upon expiration of the keep-alive expiration timeout;

iteratively sending the one or more keep-alive messages to the acceptor computing system based on the calculated keep-alive time interval, and which said one or more keep-alive messages include the unique sequence identifier, until either:

the inactivity timeout period has elapsed, until activity is detected from the acceptor, or until a maximum retry count is reached, which comprises a predetermined number of times the one or more keep-alive messages are to be sent during the inactivity timeout period; and upon receiving a message that includes the unique sequence identifier, prior to the upper limit of the inactivity timeout period being reached, resetting an inactivity timer for the inactivity timeout period such that the sequence session is kept alive and such that the upper limit of the inactivity timeout period is reset, wherein the inactivity timeout period is tunable at the application layer based on at least one of:

latency issues, network reliability, on a per connection basis, or negotiations between the initiator and the acceptor; and upon failing to receive any message that includes the unique sequence identifier prior to the upper limit of the inactivity timeout period being reached, the method further includes abandoning the sequence session.

2. The method of claim 1, wherein the received message that includes the unique sequence identifier is an application-level message.

3. The method of claim 2, wherein the application-level message includes acknowledgment responses for one or more sequence sessions.

4. The method of claim 1, wherein the sent message that includes the unique sequence identifier is an acknowledgment request message, which is an infrastructure idempotent message defined by the RM-WS protocol, and wherein the received message is an infrastructure acknowledgment message in response to the acknowledgement request message.

5. The method of claim 4, wherein the acknowledgment request message corresponds to one or more messages that have already been acknowledged as received from the acceptor.

6. The method of claim 4, wherein the acknowledgment request message includes acknowledgement requests for a plurality of sequence sessions, and wherein the received message includes a plurality of acknowledgment responses for the plurality of sequence sessions.

7. The method of claim 1, wherein the initiator is un-addressable and the initiator communicates with the accepter through SOAP over HTTP.

8. The method of claim 1, wherein the sent message that includes the unique sequence identifier is an acknowledgment request message, which is an infrastructure idempotent message defined by the RM-WS protocol, and wherein application messages to be sent to the acceptor are blocked, but the acknowledgment request message is sent anyway.

9. The method of claim 1, wherein the algorithm for calculating the keep-alive expiration timeout is further based on some fraction of the inactivity timeout period.

10. The method of claim 9, wherein the sent message that includes the unique sequence identifier is an acknowledgment request message, which is an infrastructure idempotent message defined by the RM-WS protocol, and wherein the fraction of the inactivity timeout period used for calculating the keep-alive expiration timeout is one-half the inactivity timeout period, such that the acknowledgment request message is sent when the inactivity timer reaches one-half the inactivity timeout period.

11. The method of claim 9, further comprising acts of:
calculating a keep-alive interval based on the maximum retry count, the keep-alive interval representing a period of time for sending messages; and
sending one or more messages that include the unique sequence identifier based on the calculated keep-alive interval, wherein the one or more messages sent include at least one of an application-level message or an acknowledgment request message.

12. The method of claim 11, wherein the inactivity timeout period is tunable to allow for latency imposed by the communication medium.

13. The method of claim 11, wherein the RM-WS protocol is WSReliableMessaging.

14. The method of claim 1, wherein the sent message is an application-level message.

15. The method of claim 14, wherein an acknowledgment request message is sent with the application-level message, the acknowledgement request message being an infrastructure idempotent message defined by the RM-WS protocol and used to expedite an acknowledgment response from the acceptor.

16. The method of claim 1, wherein no application or infrastructure messages are received after the expiration of the inactivity timeout period and the sequence session is abandoned.

17. The method recited in claim 1, wherein the method further includes negotiating the inactivity timeout period between the initiator computing system and the acceptor computing system prior to establishing the sequence session.

18. One or more computer readable storage devices having stored thereon computer executable instructions that, when executed by a processor, implement a method comprising:
establishing a sequence session, identified by a unique sequence identifier, at an application layer between two endpoint applications in accordance with a RM-WS protocol;
identifying an inactivity timeout period for the sequence session, the inactivity timeout period having an upper limit of time that may pass without receiving a message for the sequence session prior to the initiator computing system abandoning or failing the sequence session;
calculating a keep-alive expiration timeout based on the inactivity timeout period and which defines an interval of time that the initiator computing system will wait without detecting activity by the acceptor computing system during the inactivity timeout period and prior to beginning transmission of one or more keep-alive messages to the acceptor computing system;
calculating a keep-alive time interval, the keep-alive interval defining an interval of time that is to occur prior to each successively transmitted keep-alive message after transmission of a first keep-alive message to the acceptor computing system within the inactivity timeout period;
sending the first keep alive message upon expiration of the keep-alive expiration timeout;
iteratively sending the one or more keep-alive messages to the acceptor computing system based on the calculated keep-alive time interval, and which said one or more keep-alive messages include the unique sequence identifier, until either:
the inactivity timeout period has elapsed,
until activity is detected from the acceptor, or
until a maximum retry count is reached, which comprises a predetermined number of times the one or more keep-alive messages are to be sent during the inactivity timeout period; and
upon receiving a message that includes the unique sequence identifier, which reflects activity from the acceptor computing system, prior to the upper limit of the inactivity timeout period being reached, resetting an inactivity timer for the inactivity timeout period such that the sequence session is kept alive and such that the upper limit of the inactivity timeout period is reset, wherein the inactivity timeout period is tunable at the application layer based on at least one of:
latency issues,
network reliability,
on a per connection basis, or
negotiations between the initiator and the acceptor; and
upon failing to receive any message that includes the unique sequence identifier prior to the upper limit of the inactivity timeout period being reached, the method further includes abandoning the sequence session.

19. The one or more computer storage devices of claim 18, wherein the received message that includes the unique sequence identifier is an application-level message.

20. The one or more computer storage devices of claim 18, wherein the send message that includes the unique sequence identifier is an acknowledgment request message, which is an infrastructure idempotent message defined by the RM-WS protocol, and wherein the received message is an infrastructure acknowledgment message in response to the acknowledgement request message.

21. The one or more computer storage devices of claim 18, wherein the acknowledgment request message corresponds to one or more messages that have already been acknowledged as received from the acceptor.

22. The one or more computer storage devices of claim 18, wherein the initiator is un-addressable and the initiator communicates with the accepter through SOAP over HTTP.

23. The one or more computer storage devices of claim 18, wherein the sent message that includes the unique sequence identifier is an acknowledgment request message, which is an infrastructure idempotent message defined by the RM-WS protocol, and wherein application messages to be sent to the acceptor are blocked, but the acknowledgment request message is sent anyway.

24. The one or more computer storage devices of claim 18, wherein the algorithm for calculating the keep-alive expiration timeout is further based on some fraction of the inactivity timeout period.

25. The one or more computer storage devices of claim 24, wherein the sent message that includes the unique sequence identifier is an acknowledgment request message, which is an infrastructure idempotent message defined by the RM-WS protocol, and wherein the fraction of the inactivity timeout period used for calculating the keep-alive expiration timeout is one-half the inactivity timeout period, such that the acknowledgment request message is sent when the inactivity timer reaches one-half the inactivity timeout period.

26. The one or more computer storage devices of claim 24, further comprising computer executable instructions that can cause the messaging system to perform the following:
 calculate a keep-alive interval based on the maximum retry count, the keep-alive interval representing a period of time for sending messages; and
 send one or more messages that include the unique sequence identifier based on the calculated keep-alive interval, wherein the one or more messages sent include at least one of an application-level message or an acknowledgment request message.

27. The one or more computer storage devices of claim 26, wherein the inactivity timeout period is tunable to allow for latency imposed by the communication medium.

28. The one or more computer storage devices of claim 26, wherein the RM-WS protocol is WSReliableMessaging.

29. The one or more computer storage devices of claim 18, wherein no application or infrastructure messages are received after the expiration of the inactivity timeout period and the sequence session is abandoned.

30. The one or more computer storage devices of claim 18, wherein the sent message is an application-level message.

31. The one or more computer storage media devices of claim 30, wherein an acknowledgment request message is sent with the application-level message, the acknowledgement request message being an infrastructure idempotent message defined by the RM-WS protocol and used to expedite an acknowledgment response from the acceptor.

32. A method implemented by an initiator computer system in a Web Services (WS) environment for maintaining connection liveliness with an acceptor computing system for a sequence session between endpoints, comprising the initiator computing system and the acceptor computing system, by utilizing Reliable Messaging protocol for WS (RM-WS protocol), the method comprising acts of:
 establishing a sequence session, identified by a unique sequence identifier, at an application layer between two endpoint applications in accordance with a RM-WS protocol;
 identifying an inactivity timeout period for the sequence session, the inactivity timeout period having an upper limit of time that may pass without receiving a message for the sequence session prior to the initiator computing system abandoning or failing the sequence session;
 calculating a keep-alive expiration timeout based on the inactivity timeout period and which defines an interval of time that the initiator computing system will wait without detecting activity by the acceptor computing system during the inactivity timeout period and prior to beginning transmission of one or more keep-alive messages to the acceptor computing system, wherein the keep-alive expiration timeout is calculated by multiplying the inactivity timeout period by a fractional value of the inactivity timeout period;
 calculating a keep-alive time interval, the keep-alive interval defining an interval of time that is to occur prior to each successively transmitted keep-alive message after transmission of a first keep-alive message to the acceptor computing system within the inactivity timeout period, wherein the keep-alive time interval is calculated by obtaining a quotient of a sum of one minus the fractional value of the inactivity timeout period divided by a maximum retry count, wherein the maximum retry count is a predetermined number of times that the initiator will attempt to retransmit a message before giving up, and by multiplying the quotient by the inactivity timeout period;
 iteratively sending the one or more keep-alive messages to the acceptor computing system, and which said one or more keep-alive messages include the unique sequence identifier, until either:
  the inactivity timeout period has elapsed,
  until activity is detected from the acceptor, or
  until a maximum retry count is reached, which comprises a predetermined number of times the one or more keep-alive messages are to be sent during the inactivity timeout period;
 receiving a message that includes the unique sequence identifier, which reflects activity from the acceptor computing system, and which is received before the upper limit of the inactivity timeout period has been reached, and which maintains the connection liveliness; and
 based on the received message, resetting an inactivity timer for the inactivity timeout period such that the sequence session is kept alive.

33. A method implemented by an initiator computer system in a Web Services (WS) environment for maintaining connection liveliness with an acceptor computing system for a sequence session between endpoints, comprising the initiator computing system and the acceptor computing system, by utilizing Reliable Messaging protocol for WS (RM-WS protocol), the method comprising acts of:
 establishing a sequence session, identified by a unique sequence identifier, at an application layer between two endpoint applications in accordance with a RM-WS protocol;
 identifying an inactivity timeout period for the sequence session, the inactivity timeout period having an upper limit of time that may pass without receiving a message for the sequence session prior to the initiator computing system abandoning or failing the sequence session;
 calculating a keep-alive expiration timeout based on some fraction of the inactivity timeout period and which defines an interval of time that the initiator computing system will wait without detecting activity by the acceptor computing system during the inactivity timeout period and prior to beginning transmission of one or more keep-alive messages to the acceptor computing system, wherein the sent message that includes the unique sequence identifier is an acknowledgment request message, which is an infrastructure idempotent message defined by the RM-WS protocol, and wherein the fraction of the inactivity timeout period used for calculating the keep-alive expiration timeout is one-half the inactivity timeout period, such that the acknowledgment request message is sent when the inactivity timer reaches one-half the inactivity timeout period;
 calculating a keep-alive time interval, the keep-alive interval defining an interval of time that is to occur prior to each successively transmitted keep-alive message after transmission of a first keep-alive message to the acceptor computing system within the inactivity timeout period;
 sending the first keep alive message upon expiration of the keep-alive expiration timeout; iteratively sending the one or more keep-alive messages to the acceptor computing system based on the calculated keep-alive time interval, and which said one or more keep-alive messages include the unique sequence identifier, until either:
  the inactivity timeout period has elapsed,
  until activity is detected from the acceptor, or until a maximum retry count is reached, which comprises a predetermined number of times the one or more keep-alive messages are to be sent during the inactivity timeout period;

receiving a message that includes the unique sequence identifier, which reflects activity from the acceptor computing system, and which is received before the upper limit of the inactivity timeout period has been reached, and which maintains the connection liveliness; and based on the received message, resetting an inactivity timer for the inactivity timeout period such that the sequence session is kept alive.

34. A method implemented by an initiator computer system in a Web Services (WS) environment for maintaining connection liveliness with an acceptor computing system for a sequence session between endpoints, comprising the initiator computing system and the acceptor computing system, by utilizing Reliable Messaging protocol for WS (RM-WS protocol), the method comprising acts of:

establishing a sequence session, identified by a unique sequence identifier, at an application layer between two endpoint applications in accordance with a RM-WS protocol;

identifying an inactivity timeout period for the sequence session, the inactivity timeout period having an upper limit of time that may pass without receiving a message for the sequence session prior to the initiator computing system abandoning or failing the sequence session;

calculating a keep-alive expiration timeout based on the inactivity timeout period and which defines an interval of time that the initiator computing system will wait without detecting activity by the acceptor computing system during the inactivity timeout period and prior to beginning transmission of one or more keep-alive messages to the acceptor computing system;

calculating a keep-alive interval based on the maximum retry count, the keep-alive interval representing a period of time for sending messages, the keep-alive interval defining an interval of time that is to occur prior to each successively transmitted keep-alive message after transmission of a first keep-alive message to the acceptor computing system within the inactivity timeout period;

sending the first keep alive message upon expiration of the keep-alive expiration timeout; iteratively sending the one or more keep-alive messages to the acceptor computing system based on the calculated keep-alive time interval, and which said one or more keep-alive messages include the unique sequence identifier and at least one of an application-level message or an acknowledgment request message, until either:

the inactivity timeout period has elapsed, until activity is detected from the acceptor, or until a maximum retry count is reached, which comprises a predetermined number of times the one or more keep-alive messages are to be sent during the inactivity timeout period;

receiving a message that includes the unique sequence identifier, which reflects activity from the acceptor computing system, and which is received before the upper limit of the inactivity timeout period has been reached, and which maintains the connection liveliness; and based on the received message, resetting an inactivity timer for the inactivity timeout period such that the sequence session is kept alive, wherein the inactivity timeout period is tunable to allow for latency imposed by the communication medium.

35. A method implemented by an initiator computer system in a Web Services (WS) environment for maintaining connection liveliness with an acceptor computing system for a sequence session between endpoints, comprising the initiator computing system and the acceptor computing system, by utilizing Reliable Messaging protocol for WS (RM-WS protocol), the method comprising acts of:

establishing a sequence session, identified by a unique sequence identifier, at an application layer between two endpoint applications in accordance with a RM-WS protocol;

identifying an inactivity timeout period for the sequence session, the inactivity timeout period having an upper limit of time that may pass without receiving a message for the sequence session prior to the initiator computing system abandoning or failing the sequence session;

calculating a keep-alive expiration timeout based on the inactivity timeout period and which defines an interval of time that the initiator computing system will wait without detecting activity by the acceptor computing system during the inactivity timeout period and prior to beginning transmission of one or more keep-alive messages to the acceptor computing system;

calculating a keep-alive time interval, the keep-alive interval defining an interval of time that is to occur prior to each successively transmitted keep-alive message after transmission of a first keep-alive message to the acceptor computing system within the inactivity timeout period;

sending the first keep alive message upon expiration of the keep-alive expiration timeout; iteratively sending the one or more keep-alive messages to the acceptor computing system based on the calculated keep-alive time interval, and which said one or more keep-alive messages include the unique sequence identifier, until either:

the inactivity timeout period has elapsed, until activity is detected from the acceptor, or until a maximum retry count is reached, which comprises a predetermined number of times the one or more keep-alive messages are to be sent during the inactivity timeout period;

receiving a message that includes the unique sequence identifier, which reflects activity from the acceptor computing system, and which is received before the upper limit of the inactivity timeout period has been reached, and which maintains the connection liveliness; and based on the received message, resetting an inactivity timer for the inactivity timeout period such that the sequence session is kept alive, wherein the method further includes negotiating the inactivity timeout period between the initiator computing system and the acceptor computing system prior to establishing the sequence session.

36. One or more computer readable storage devices having stored thereon computer executable instructions that, when executed by a processor, implement a method comprising:

establishing a sequence session, identified by a unique sequence identifier, at an application layer between two endpoint applications in accordance with a RM-WS protocol;

identifying an inactivity timeout period for the sequence session, the inactivity timeout period having an upper limit of time that may pass without receiving a message for the sequence session prior to the initiator computing system abandoning or failing the sequence session;

calculating a keep-alive expiration timeout based on some fraction of the inactivity timeout period and which defines an interval of time that the initiator computing system will wait without detecting activity by the acceptor computing system during the inactivity timeout period and prior to beginning transmission of one or more keep-alive messages to the acceptor computing system, wherein the sent message that includes the unique sequence identifier is an acknowledgment request message, which is an infrastructure idempotent message defined by the RM-WS protocol, and wherein the fraction of the inactivity timeout period used for calculating the keep-alive expiration timeout is one-half the inactivity timeout period, such that the acknowledgment request message is sent when the inactivity timer reaches one-half the inactivity timeout period;

calculating a keep-alive time interval, the keep-alive interval defining an interval of time that is to occur prior to each successively transmitted keep-alive message after transmission of a first keep-alive message to the acceptor computing system within the inactivity timeout period;

sending the first keep alive message upon expiration of the keep-alive expiration timeout; iteratively sending the one or more keep-alive messages to the acceptor computing system based on the calculated keep-alive time interval, and which said one or more keep-alive messages include the unique sequence identifier, until either:
the inactivity timeout period has elapsed,
until activity is detected from the acceptor, or
until a maximum retry count is reached, which comprises a predetermined number of times the one or more keep-alive messages are to be sent during the inactivity timeout period;

receiving a message that includes the unique sequence identifier, which reflects activity from the acceptor computing system, and which is received before the upper limit of the inactivity timeout period has been reached, and which maintains the connection liveliness; and based on the received message, resetting an inactivity timer for the inactivity timeout period such that the sequence session is kept alive.

37. One or more computer readable storage devices having stored thereon computer executable instructions that, when executed by a processor, implement a method comprising:

establishing a sequence session, identified by a unique sequence identifier, at an application layer between two endpoint applications in accordance with a RM-WS protocol;

identifying an inactivity timeout period for the sequence session, the inactivity timeout period having an upper limit of time that may pass without receiving a message for the sequence session prior to the initiator computing system abandoning or failing the sequence session, wherein the inactivity timeout period is tunable to allow for latency imposed by the communication medium;

calculating a keep-alive expiration timeout based on some fraction of the inactivity timeout period and which defines an interval of time that the initiator computing system will wait without detecting activity by the acceptor computing system during the inactivity timeout period and prior to beginning transmission of one or more keep-alive messages to the acceptor computing system;

calculating a keep-alive time interval based on the maximum retry count, the keep-alive interval representing a period of time for sending messages, the keep-alive interval defining an interval of time that is to occur prior to each successively transmitted keep-alive message after transmission of a first keep-alive message to the acceptor computing system within the inactivity timeout period;

sending the first keep alive message upon expiration of the keep-alive expiration timeout; iteratively sending the one or more keep-alive messages to the acceptor computing system based on the keep-alive interval, and which said one or more keep-alive messages include the unique sequence identifier and include at least one of an application-level message or an acknowledgment request message, until either:
the inactivity timeout period has elapsed,
until activity is detected from the acceptor, or
until a maximum retry count is reached, which comprises a predetermined number of times the one or more keep-alive messages are to be sent during the inactivity timeout period;

receiving a message that includes the unique sequence identifier, which reflects activity from the acceptor computing system, and which is received before the upper limit of the inactivity timeout period has been reached, and which maintains the connection liveliness; and based on the received message, resetting an inactivity timer for the inactivity timeout period such that the sequence session is kept alive.

* * * * *